United States Patent [19]

Fellure et al.

[11] 4,093,844

[45] June 6, 1978

[54] ARC LENGTH MEASUREMENT AND CONTROL BY OPTICAL SCANNING

[75] Inventors: James Erwin Fellure, Heath; Endre Leslie Toth, Lancaster, both of Ohio

[73] Assignee: Arcair Company, Lancaster, Ohio

[21] Appl. No.: 723,362

[22] Filed: Sept. 14, 1976

[51] Int. Cl.² .................................................. B23K 9/10
[52] U.S. Cl. ........................ 219/124.02; 219/130.21; 219/137.71; 358/101
[58] Field of Search ............... 219/124, 131 R, 131 F, 219/135, 125 R; 356/158, 168; 358/101, 107

[56] References Cited

U.S. PATENT DOCUMENTS

| | | | |
|---|---|---|---|
| 3,209,121 | 9/1965 | Manz | 219/125 R |
| 3,262,006 | 7/1966 | Sciaky et al. | 219/125 R |
| 3,271,558 | 9/1966 | Davis | 219/131 R |
| 3,526,748 | 9/1970 | Rienks | 219/131 F |
| 3,532,807 | 10/1970 | Webb | 219/124 |
| 3,602,687 | 8/1971 | Pollock | 219/131 F |
| 3,781,467 | 12/1973 | Soames | 358/107 |
| 3,889,055 | 6/1975 | Knight | 356/158 |

FOREIGN PATENT DOCUMENTS

| | | | |
|---|---|---|---|
| 2,511,915 | 10/1975 | Germany | 219/131 R |
| 2,500,182 | 7/1976 | Germany | 219/125 |

OTHER PUBLICATIONS

Alan J. Weissberger, "Microprocessors Simplify Industrial Control," *Electronic Design* 22, 10/25/1975, pp. 96-99.

*Primary Examiner*—J. V. Truhe
*Assistant Examiner*—Clifford C. Shaw
*Attorney, Agent, or Firm*—James C. Simmons; Barry Moyerman

[57] ABSTRACT

An arc length welding control system in which a welding arc is established between a pair of electrodes. An optical device optically senses the arc and produces signals related to the arc. An optical circuit is responsive to these arc signals for measuring the arc length and produces data signals related to that length. One or more control devices are varied in response to the data signals for controlling the length of the arc to a desired value.

14 Claims, 8 Drawing Figures

ARC LENGTH MEASUREMENT AND CONTROL BY OPTICAL SCANNING

BACKGROUND OF THE INVENTION

A. Field of the Invention

This invention relates to the field of art of control of the length of a welding arc.

B. Prior Art

In the welding art it has been desired to accurately control the length of the welding arc. This is a particularly important problem in automatic machine welding in which welds at high production rates are made by machine operators rather than by welder craftsmen. For example in the volume welding of artillery shells the arc length must be controlled to provide sufficient heat in order to melt the welding electrode wire and auxiliary wire and to heat the outer layer of artillery shell base metal to the melting point of the artillery shell overlay material. The arc energy must be carefully controlled to assure intermetallic bonding without actual mixing the two metals.

Thus, for example, when the arc length has been shorter than optimum, the heat of the arc has been concentrated in a smaller than optimum area thereby providing an undesirably high temperature to the base metal. Accordingly, the arc would dig in, deeply penetrate the shell and undesirably result in iron dilution in the overlay material.

It has previously been believed that arc voltage has determined arc length. However, the arc voltage that has been actually measured was the power source voltage which is the total voltage between the point where the welding electrode wire is coupled to current source and the bottom of the arc or workpiece. That source voltage has been made up of a voltage portion heating the welding wire and a voltage portion maintaining the arc length where these voltage portions have been unknown factors as they have been continually changing. These changes are caused, for example, by the welding electrode wire being coupled to the current source by contact with a long contact tube at a point of entry or point of exit or any place in between. Other voltage variations have been caused by the use of welding electrode wire made of differing metals with various electrical resistance. Further, the surface resistance of welding electrode wire may change as a result of the surface quality of the wire. The contamination of the wire's exterior causes a voltage variation which causes a change in arc voltage and thus arc length.

Accordingly, an object of the present invention is a system for automatically controlling the length of a welding arc.

SUMMARY OF THE INVENTION

An optical system for controlling the length of a welding arc formed between a pair of electrodes. Optical means optically senses the arc and produces signals related to the arc. An optical circuit is coupled to the optical means and is responsive to the arc signal for measuring the arc length and producing data signals related to that length. In response to the data signals, the length of the arc is controlled to a desired value.

DETAILED DESCRIPTION

Figure 1:
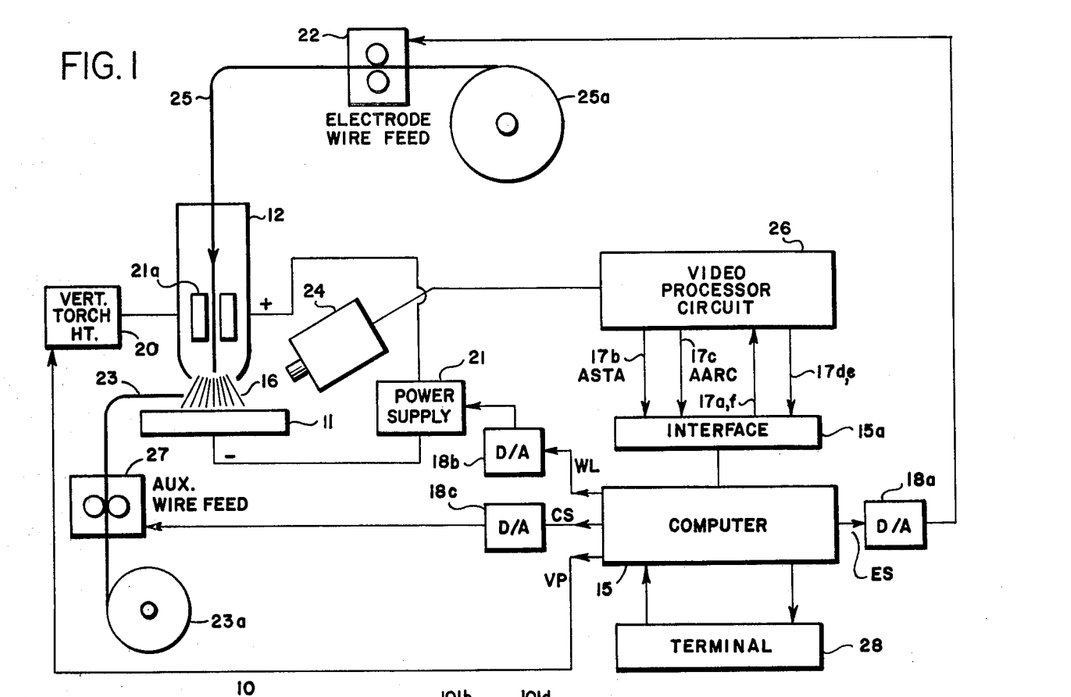
FIG. 1 is a block diagram of an arc length welding control system in accordance with the invention.

Referring now to FIG. 1, there is shown an arc welding system 10 in which an arc 16 is controlled in length. In general, a plurality of arc control means, viz, wire feed 22, vertical torch height 20, auxiliary wire feed 27 and power supply 21 are used to control the length of arc 16. An optical device (such as camera 24) is used for optically sensing arc 16 and producing signals related to the arc. These arc signals are used to measure the arc length and data signals are produced related to that length. The data signals are compared with a reference for producing a deviation which is effective to vary the arc control means and in this way to control the length of the arc.

In the embodiment shown in FIG. 1, a television camera 24 is aimed at arc 16 so that the image of arc 16 appears on the screen of the camera as a distinct bright image which has passed through optical filters. The number of scan lines of camera 24 covering this bright image operates as a means of measurement for system 10. Camera 24 may be of the type later set forth in the Table of Components.

In general, the output of camera 24 is applied to a video processor 26. Processor 26 is effective to produce a coded output which is a function of the position and the length of arc 16 and to apply that output to computer 15. Computer 15 also receives information from a terminal 28 relating to system parameters, viz, welding voltage, amperage, wire speed, torch height, arc length and set point. Four devices are controlled in order that the actual arc length 16 be maintained at substantially the desired value. Specifically, computer 15 controls at least one of (1) the weld level of a welding power supply 21, (2) the vertical height of torch 12 by means of motion controller 20, (3) the speed of electrode wire 25 (from wire reel 25a) by means of a wire feeder 22, and (4) the speed of a cold or auxiliary wire 23 (from real 23a) by means of an auxiliary wire feeder 27.

Welding power supply 21 is coupled between workpiece 11 and contact tube 21a through which wire 25 passes. It will be understood that since the bottom of arc 16 always originates at workpiece 11, system 10 is able to force arc 16 to follow a desired contour, while maintaining a desired arc length, when system 10 is coupled to a conventional motorized torch positioning mechanism. Thus, system 10 in all cases maintains the torch 12 to workpiece 11 distance regardless of the contour by measuring and maintaining the arc length.

Video camera 24 is aimed at arc 16 through a conventional welding filter and scans the arc at a rate of 60 times per second. Camera 24 has 245 scan lines on its screen with a scan time of approximately 16.6 milliseconds. The number of scan lines covering the bright image of the arc on the video screen serves as a means of measurement for system 10.

It will be understood that when the image of arc 16 is properly placed in the field of view of camera 24, the image may move up or down or side to side in this field.

However the image moves, system 10 is effective to count the number of horizontal scans which intersect the image of arc 16 regardless of the position of the image in the field.

As understood by those skilled in the art, the optical lens system of camera 24 determines the resolution of the measurement due to the magnification of arc 16 with respect to the available scan lines. In a typical example, the resolution of the system may be ± 0.010 inch which is the measurement between scan lines. It will be understood that other optoelectric or photoelectric sensing devices may be used for the same scanning purposes such as photodiode arrays. The particular device used would depend on the required dimensional resolution and frequency response.

Camera 24 may be internally clocked at 60 Hz to provide a total frame time of approximately 16.6 milliseconds. The scan time may be approximately 15.5 milliseconds and the vertical retrace would take approximately 1.25 milliseconds, ± 0.150 milliseconds.

Figure 2:
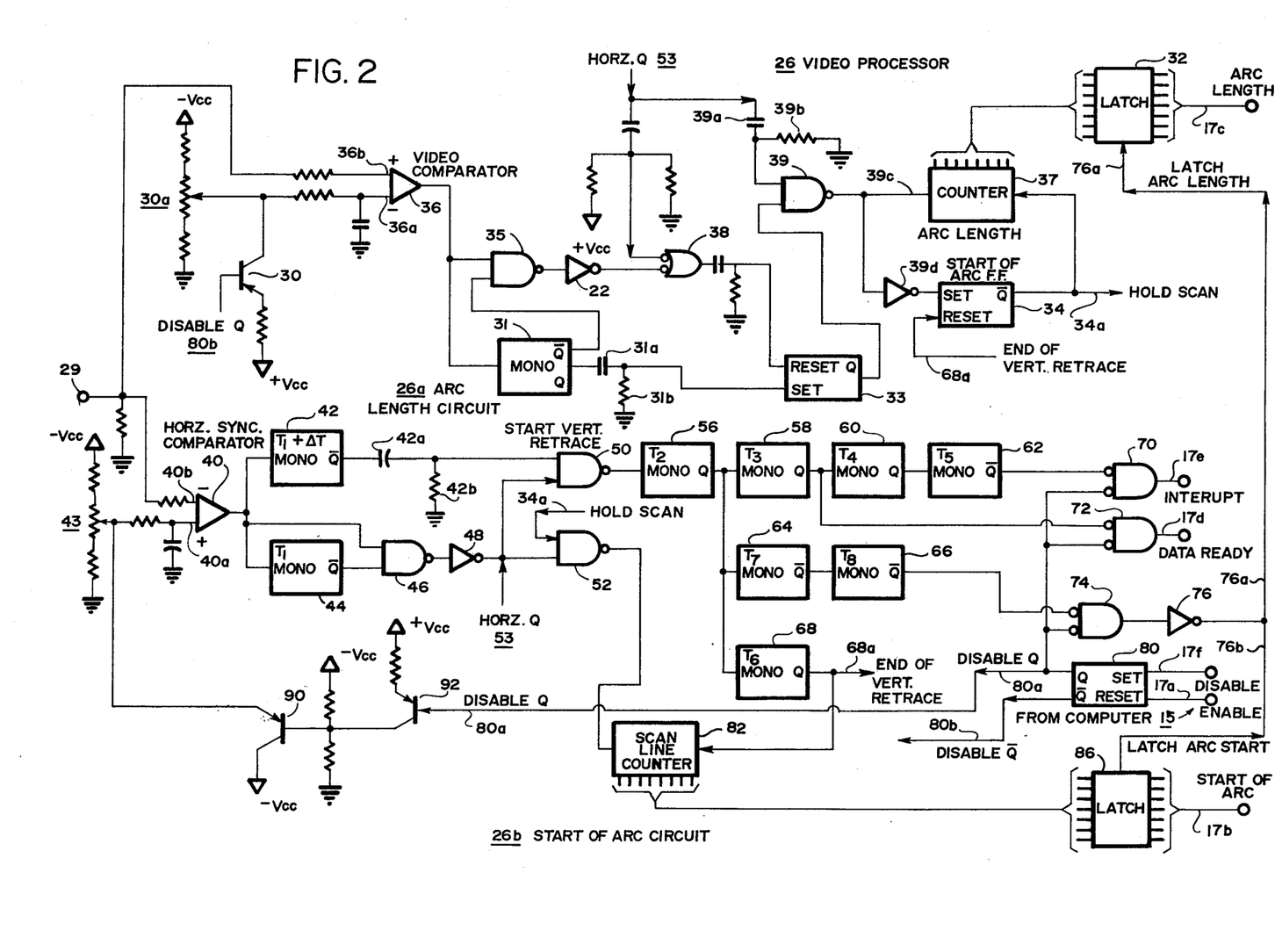
FIG. 2 is a circuit diagram showing the details of the video processor circuit of FIG. 1.
Figure 3:
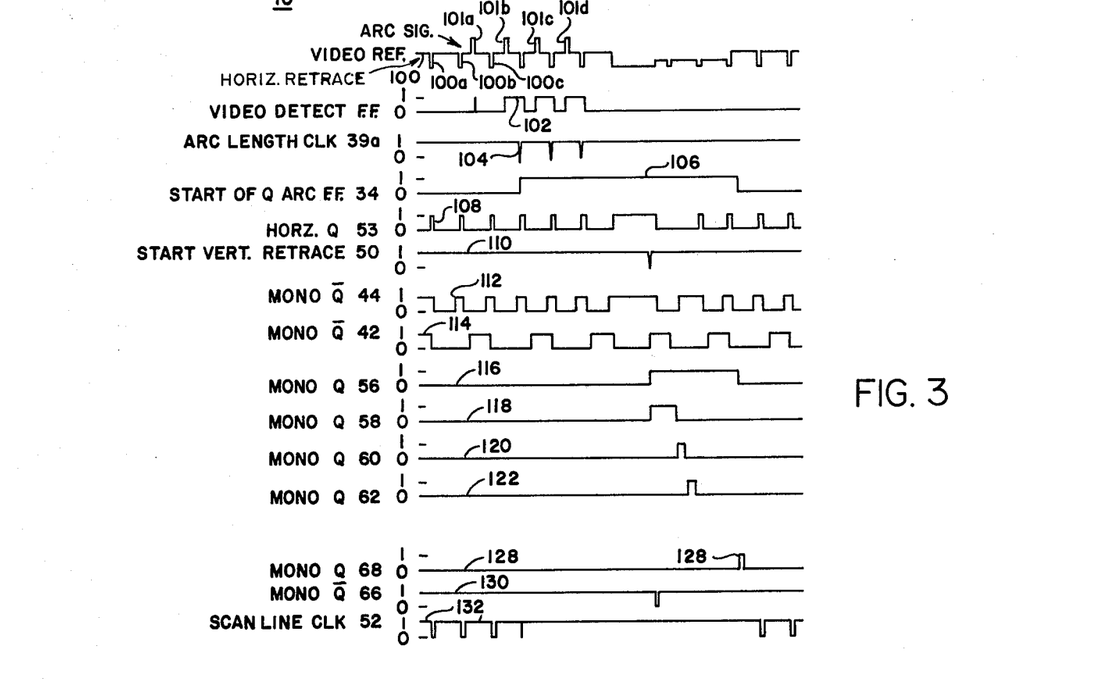
FIG. 3 is a series of waveforms helpful in explaining the operation of the video processor circuit of FIG. 2.

The output of camera 24 is a video signal 100 shown in FIG. 3. The portions of the video signal 100 above the reference level, viz, arc signals 101a, b, etc., are produced when the video beam sweeps the image of arc 16. Thus, an arc signal 101a is produced when the sweep first strikes the top portion of the arc image, signal 101b is produced when the sweep next strikes the arc image, etc. The portions of signal 100 below the reference level are horizontal retrace signals 100a, b, etc. Video signal 100 from camera 24 is applied to video processor 26 as shown in FIG. 1 and as shown in more detail in FIG. 2, the video signal is applied to an input 29 of the video processor.

Video processor 26 comprises two basic circuits one of which is an arc length circuit 26a and the other of which is a start of arc circuit 26b which determines when the arc actually starts. In order to begin operation of circuits 26a, b an enable signal is applied from computer 15 by way of line 17a. This enable signal is effective to reset flip-flop 80 which produces signals on lines 80a, b which are effective to turn on transistor 92 and turn off transistor 30.

With transistor 92 turned on, transistor 90 is turned off thus to enable the horizontal sync comparator 40. Accordingly, voltage divider 43 is then effective to apply a reference potential at a value between the potential of the negative supply and ground to one input 40a of comparator 40. The other input 40b of comparator 40 is coupled to input terminal 29 of video processor 26. Comparator 40 is effective to compare the negative going horizontal retrace signals 100a, b, etc. with the reference level and provide an output signal which is effective to drive both monostable multivibrators (monos) 42, 44.

At the time of the first horizontal retrace signal 100a, mono 44 is triggered which produces a signal 112 shown in FIG. 3. This signal is applied to one input of a NAND gate 46, the other input of which is coupled to the output of comparator 40. Accordingly, gate 46 produces a signal which is inverted by inverter 48 and results in horizontal Q "HORZ Q" signals 108 on line 53.

As will later be described in detail, hold scan line 34a is effective to enable NAND gate 52 and thus the HORZ Q signals 108 are passed by gate 52 and is effective to increment scan line counter 82. In this way, counter 82 serially counts horizontal retrace pulses 100a, b, c, etc. where each count of a horizontal retrace pulse is a count of a horizontal sweep.

The contents of counter 82 is transferred to latch 86 only when the latch is actuated by a latch arc start signal from gate 74. As a result, latch 86 will contain the number of horizontal scan lines that have occurred up to the location of the first video beam sweep which detects the image of arc 16. This information from latch 86 is transferred to computer 15 by way of multibit digital bus 17b.

The output waveshape 114 of mono 42 as shown in FIG. 3 is applied through a differentiator of a capacitor 42a and resistor 42b to one input of a start vertical retrace NAND gate 50. The other input of gate 50 is enabled by HORZ Q signal on line 53. With gate 50 enabled, the output signal therefrom is effective to drive mono 56 which is switched to its quasi-stable state in the manner shown in FIG. 3. Mono 56 is maintained in its quasi-stable state until time $t_a$ which is the vertical retrace time as will later be described in detail.

Arc length circuit 26a will now be described. With transistor 30 turned off during operation of processor 26, voltage divider 30a is effective to apply a reference potential of value between a negative supply and ground to one input 36a of video comparator 36. The other input 36b of comparator 36 is coupled to input terminal 29. Comparator 36 is effective to compare the positive going arc signals 101a, b, etc. with the reference level. Specifically, at the time of pulse 101a, (where pulse 101a represents the detection of the start of arc 16) comparator 36 produces an output pulse which is applied to trigger mono 31 and enable gate 35. The Q output from mono 31 is differentiated by the combination of capacitor 31a and resistor 31b which differentiated pulse output is effective at the beginning of the quasi-stable state of mono 31 to set flip-flop 33.

Accordingly, at the time mono 31 is triggered, a set pulse is applied to vertical detector flip-flop 33. This flip-flop remains set until it is reset when arc signals 101a-d, etc. go low enough or decrease in value so that comparator 36 no longer senses a positive going signal. At that time, NAND gate 35 is disabled and the resultant output is inverted and applied to one input of gate 38. The other input of gate 38 receives differentiated HORZ Q signals 108 by way of line 53. As previously described, the HORZ Q signals are also used with respect to the start of arc signal. In this manner, gate 38 has applied thereto horizontal Q signals as well as the video comparator signal which produces an output signal. That output signal is differentiated and resets flip-flop 33.

Further, HORZ Q signals 108 on line 53 are also differentiated by capacitor 39a, resistor 39b and applied through NAND gate 39 into arc length counter 37. In this manner for every HORZ Q signal 108 shown in FIG. 3, there is provided a pulse into counter 37 which keeps track of the number of HORZ Q pulses until the arc signal goes low as determined by the output of video comparator 36. At that time, flip-flop 33 is reset which in turn disables gate 39 and no longer permits count pulses to enter counter 37.

In this manner, arc signals 101a-d, etc. may be counted by counter 37. The number of counts in counter 37 is strobed from the counter into latch 32 upon application of latch arc length signal from gate 74. Accordingly, the contents of latch 32 represent a number proportional to arc length which is applied by way of multibit bus 17c to computer 15.

Pulse 101a which represents the detection of the start of the arc is effective by way of gate 39 and inverter 39d to set start of arc flip-flop 34. With flip-flop 34 set, there is provided an enable signal on hold scan line 34a which enables counter 37 to make the count previously described. At the end of the vertical retrace, a signal 128, (FIG. 3) on line 68a is effective to reset flip-flop 34. With flip-flop 34 reset, counter 37 stops counting whether or not there is an arc signal detected.

It will also be understood that with flip-flop 34 set, the signal on line 34a is also effective to disable gate 52. As a result, no further horizontal retrace signals 101a, b, etc. may be applied to counter 82. Accordingly, it will now be understood that counter 82 is effective to count the number of horizontal retrace signals which occur prior to the detection of the start of the arc.

As previously described, flip-flop 34 remains set until the end of the vertical retrace. Thus, the flip-flop prevents counter 82 from counting until that time. The end of the vertical retrace signal 108 is provided by the output of mono 56 being applied to an input of mono 68, the output of which is signal 108. It will be understood that the end of the vertical retrace signal marks the end of the frame.

Gate 74 is effective to provide a latch arc length signal by way of line 76a and a latch arc start signal by way of line 76b. Gate 74 is actuated by a mono chain comprising monos 64 and 66 with the input to mono 64 being taken from the output of mono 66. Monos 64, 66 provide a time delay after the end of the frame as determined by mono 56. This time after the frame determines the time to latch in the arc length data as well as the start of the arc data.

After the arc length data is latched in, mono 58 is effective to provide a signal to gate 72 for a data ready signal to computer 15 by way of line 17d. Thereafter, as a later signal, mono 58 is effective to drive monos 60, 62 to provide a signal for gate 70. Gate 70 generates an interrupt signal by way of line 17e to computer 15.

As shown in FIG. 1, lines 17a-f are coupled to computer 15 by way of an interface unit 15a. Unit 15a comprises a set of opto-isolators which avoids any conductive coupling between video processor 26 and computer 15. Accordingly, unit 15a acts as a buffer interface between the processor and the computer.

As previously described with respect to FIG. 2, lines 17b and 17c each represent multibit digital data buses which output data from the video processor 26 to computer 15. Lines 17a and 17f carry data signals from the computer to the video processor while lines 17d and 17e carry data signals from the processor to the computer. Lines 17a and 17f respectively are enable and disable lines, by which means computer 15 enables or disables the video processor as required by the routines outlined in the flowcharts of FIGS. 4-6 and signals from input/output terminal 28. Video processor 26 is enabled whenever an arc is established. A signal appears on the data ready line 17d when the counters 37 and 82 have completed their counts and the counts have been latched into registers 32 and 86. Line 17e provides a signal which appears a short time later and which the computer is programmed to recognize as a signal to interrupt, for example, its idle state and to read the data available and make the computations of the set points which are utilized in the manner later described.

As shown in FIG. 1, computer 15 is controlled and monitored via input/output terminal 28. Among the inputs from terminal 28 to computer 15 are data words representing the arc length set point, arc start position reference and initial set points for the weld power level from power supply 21, the vertical torch height set by stepping motor 20, the speed of electrode wire feed 22 and the speed of cold wire feed 27.

These initial set points are passed on to the controlling devices by computer 15 and, as the weld progresses, they are modified by the computer in response to differences that develop between the measured arc length and the set arc length. Furthermore, the position of the arc starting point is tracked and this signal is used to adjust the height of the torch so that as a workpiece of varying height passes under the torch, the position of the torch will follow the contour and minimize the range of arc length errors (arc start error).

FIGS. 4, 5A-C and 6 represent, in flowchart form, the steps which are repetitively taken by computer 15 to compute the set points. Parameters of the arc length control are as follows:

ALPS = Arc Length Set Point
AREF = Nominal location of arc starting point (workpiece surface)
AARC = Actual arc length (from latch 32 via lines 17c)
ASTA = Actual arc starting point position (from latch 86 via lines 17b)
KP = Proportional Constant
TI = Integral Time Constant
TD = Derivative Time Constant
F1 = Scalar Factor; 1/100 of amount of weld power level increase required to change the arc length by 0.01 inch.
F2 = Similar to F1 only applies to the torch vertical travel
F3 = Similar to F1 only applies to the electrode wire speed
F4 = Similar to F1 only applies to the cold wire speed
KW = Percent of arc length change to be caused by changing the weld level
KV = Percent of arc length change to be caused by changing the torch vertical position
KE = Percent of arc length change to be caused by changing the electrode wire speed
KC = Percent of arc length change to be caused by changing the cold wire speed
WLSP = Weld Power Level Set Point
VPSP = Vertical Torch Position Set Point (torch to workpiece distance)
ELSP = Electrode Wire Speed Set Point
CLSP = Cold Wire Speed Set Point
WLOSF = Weld Level Output Scale Factor
ELOSF = Electrode Wire Speed Output Scale Factor
CLOSF = Cold Wire Speed Output Scale Factor
VPSOF = Torch Vertical Position Output Scale Factor
WL = Weld Power Level Command
VP = Vertical Torch Position Command
ES = Electrode Wire Speed Command
CS = Cold Wire Speed Command Video processor 26 which completes a raster scan at the rate of 60 times per second issues data ready and interrupt signals on lines 17d and 17e. Computer 15 is interrupted from its idle state in this manner every 1/60 of a second and performs steps as outlined by the flowchart. When interrupted, the computer accepts an input, i.e., reads the data stored in arc length latch 32. This data appears on 8 parallel data bit lines and is the binary number of raster lines upon which the arc is visible as heretofore described. This number is stored in a temporary arc length register 32 (of FIG. 2) and is added to the sum of previous number that were stored there on previous passes of this program. Similarly, the data stored in the arc start position latch 36 is stored in a temporary arc start register in computer 15 and added to the sum of previous values that were stored there. When this succession of read and store operations have occurred six times, the total in the temporary arc length register is stored in register AARC and the sum in the temporary arc start sample register is stored in register ASTA. Following these steps, the two sample registers are cleared.

Figure 4:
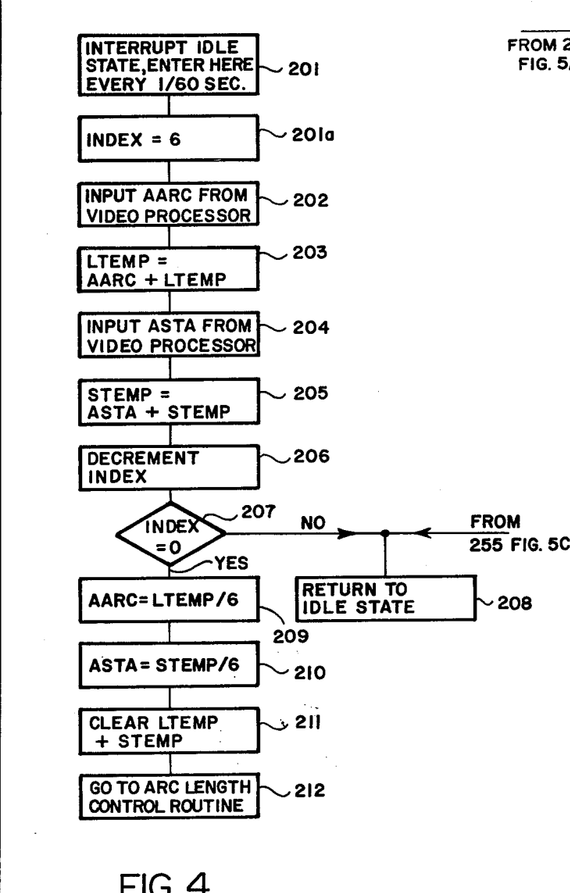
FIG. 4 is a flowchart showing the arc length service routine.

The arc length service routine for computer 15 is represented in flowchart form by FIG. 4. This routine is entered at block 201, 60 time each second when the video processor output an interrupt signal on line 17e. This causes computer 15 to leave its idle state and to start running through this routine. The first step is illustrated by block 201a in which the number 6 is stored in INDEX register. Block 202 represents the transfer of the data stored in arc length register latch 32. In block 203, the arc length data AARC is added to contents of register LTEMP. In blocks 204 and 205, the arc starting position data is similarly transferred from register latch 86 and added to the contents stored in register STEMP. Block 206 represents decrement of the INDEX register. If the contents of INDEX are not zero, the routine ends here with a return to the idle state which had been interrupted as represented by block 208. When the contents of INDEX does become zero, the program branches to block 209 which represents a series of steps which devides the number stored in register LTEMP by 6 and stores the quotient in register AARC. Likewise, block 210 represents division of the contents of register STEMP by 6 storing the quotient in register ASTA. Following these steps, registers LTEMP and STEMP are cleared as represented by block 211 following which the arc length control routine is entered as shown on block 212.

The effect of the arc length service routine is to average the six arc length and six arc start position measurements made during successive periods 1/10 second long. Averaging is done by summing six successive measurements of each type, dividing the sum by six, and then clearing the registers for the next set of six measurements to be averaged. As pointed out previously, the sampling rate is controlled by the video processor which generates interrupt signals at the rate of 60 times per second. Subsequently, entry to the arc length control routine is forced ten times per second by the affirmative branch from block 207 which occurs on every sixth pass through the routine of FIG. 4.

Prior to a discussion of the flowchart of FIGS. 5A-C, the terms involved in the computation of the set point reference commands are defined as follows:

$$E = AARC - ALPS \qquad (1)$$

$$YE = ASTA - AREF \qquad (2)$$

$$DELTA = KP(E1 - E) + KP(E)/TI + KP(TD)((E2 - E1)-(E1 - E)) \qquad (3)$$

$$WLSP = VLSP1 + DELTA (KW) F1 \qquad (4)$$

$$VPSP = WLSP1 + DELTA (KV)F2 + YE \qquad (5)$$

$$ELSP = ELSP1 + DELTA (KE)F3 \qquad (6)$$

$$CLSP = CLSP1 + DELTA (KC)F4 \qquad (7)$$

$$WL = WLOSF (WLSP) \qquad (8)$$

$$ES = ELOSF (ELSP) \qquad (9)$$

$$CS = CLOSF (CLSP) \qquad (10)$$

$$VP = VPOSF (VPSP) \qquad (11)$$

The above equation 1 defines the arc length error which is the arithmetic difference between the number representing the measured arc length AARC and the arc length set point or reference ALPS. Similarly, equation 2 defines the arc starting position error YE which is the difference between the measured arc starting point position ASTA and the referenced starting position AREF. Equation 3 defines DELTA which is a function not only of the most recently determined arc length error but is also the function of the errors determined during the two previous computations. These computations are made in each pass of the arc length control routine represented by the flowchart of FIGS. 5A-C. KP, TI and TD are constants previously defined. E is the arc length error determined during the present pass. E1 is the arc length error determined on the previous pass and subsequently stored for access for computation during this pass. Likewise, E2 is the arc length error that had been determined two passes before and had also been stored for availability in this pass. Equations 4, 5, 6 and 7 define the set points for the four different controllers which affect the arc length. These equations show that the set point computed during the present pass is equal to the previously computed set point with the quantity DELTA, weighted by the appropriate scale factor and change factor, added. For example, the weld level set point WLSP is equal to the previously calculated weld point WLSP1 plus the product of DELTA, KW and F1. Equations 5, 6 and 7 are similar with the exception that equation 5 has an additional adjustment term, YE, which is the error between the measured arc starting position and the referenced arc starting position.

When a weld is started and no error information is available, the values for the four set points defined by equations 4–7 are obtained from data entered into the computer from terminal 28.

Equations 8, 9, 10 and 11 illustrate modification of the computed set points by fixed scaling factors, to produce appropriate digital command data suitable for the particular D/A converters and stepping motor associated with the controllers. For instance, the digital signal WL entering D/A converter 18b is obtained by multiplying scale factor WLOSF by the computed set point WLSP. WLOSF scales the digital set point command to produce the proper analog output of the D/A controlling the weld level. Similarly, set point ELSP is modified by scale factor ELOSF prior to entering D/A converter 18a which produces the analog voltage controlling the speed of the electrode wire feed. Set point CLSP is modified by scale factor CLOSF to produce an appropriate input CS to D/A converter 18c which produces the analog voltage which controls the cold wire feed speed. Finally, set point VPSP is modified by scale factor VPOSF to produce VP which is the number of steps that stepper motor 20 which vertically positions the torch must take.

Figure 5A:
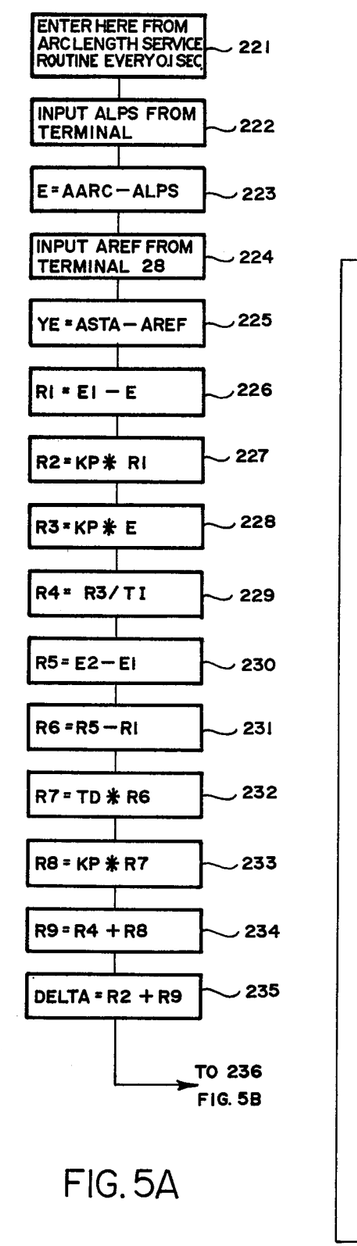
FIGS. 5A-C are flowcharts showing the arc length control routine.
Figure 5B:
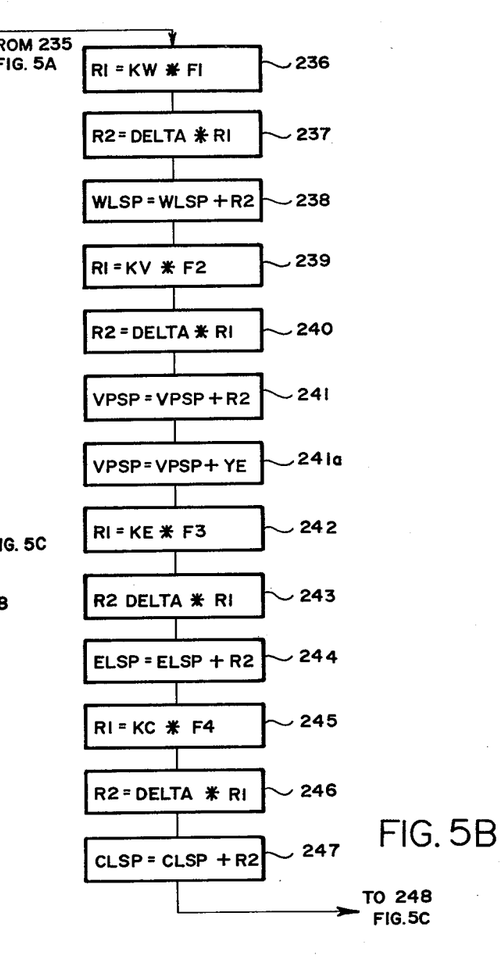
Figure 5C:
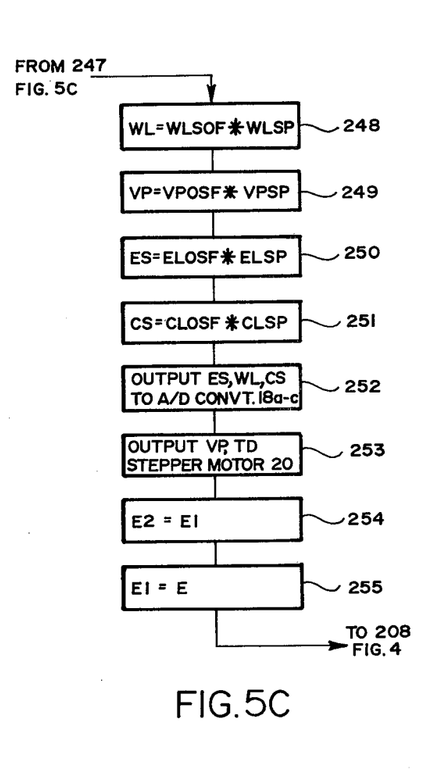

FIGS. 5A–C represent, in flowchart form, the arc length control routine. As explained previously, this routine is entered ten times each second following the end of the arc length service routine. Entry is denoted by block 221. Block 222 represents the input of the arc length set point entered in terminal 28 by the operator. This quantity is denoted by ALPS. The following block 223 represents the computation of error E as the arithmetic difference between measured arc length AARC and the arc length set point or reference ALPS. Blocks 224 and 225 represent a similar input of the arc start position reference AREF from the terminal and the subsequent computation of the arc start position error YE, the difference between the measured arc start position ASTA and arc start reference AREF. Blocks 226–235 represent the computation of the quantity DELTA. KP, TI and TD are constants stored in registers of computer 15. Other registers R1 through R9 of computer 15 are temporary registers for the storage of intermediate results in this computation. E1 is the arc length error which had been calculated during the previous pass of this routine, 1/10 of a second before. Similarly, E2 is the arc length error which had been calculated 2/10 of a second previously.

The operations defined by blocks 226 and 227 form the term KP (E1 − E). Blocks 228 and 229 denote the formation of the term KP (E)/TI. Blocks 230 through 233 denote the formation of the term KP (TD)((E2 − E1)−(E1 E)). Finally, steps 234 and 235 represent a summation of these three terms to obtain the quantity which is stored in the DELTA register. Blocks 236 and 237 represent the formation of a product of DELTA, scalar factor F1 and factor KW. The F and K factors are constants stored in registers in computer 15.

The resultant product DELTA (KW)(F1) is stored in temporary register R2. Register WLSP which stores the weld level previously computed has the contents of register R2 added to it to produce an updated weld level set point as denoted by block 238. Blocks 239, 240 and 241 similarly represent the updating of the vertical position set point as a function of DELTA and the stored constants associated with vertical position. The arc start position error term YE is also added to the contents of register VPSP as denoted by block 241a. Similarly, electrode wire speed set point register ELSP is updated by the operations in blocks 242–244 and the cold wire speed set point register CLSP is updated by the operations denoted in blocks 245–247. Blocks 248–251 represent inpedendent multiplication steps which modify the updated set points by their associated scaling factors to produce the command outputs which are presented to D/A converters 18a–c and to stepping motor 20 to effect the establishment of new operating levels as required and as represented by blocks 252–253.

Digital quantity WL is input to D/A converter 18b whose analog output sets the operating level of the weld power supply 21. Digital quantity VP is fed to the vertical torch height stepping motor 20 so that the motor makes the corresponding number of positioning steps thus setting the torch height to the desired position. Digital quantity ES is delivered to D/A converter 18a whose analog output controls the speed of electrode wire feed 22. Digital output CS is fed to D/A converter 18c whose analog output controls the speed of the control wire feed 27. The arc length error thus causes a proportional change in the set points of the various controls in a direction such that a measured error will be reduced or cancelled. Inclusion of information regarding errors computed in the previous passes of this routine moderates these changes to prevent hunting and other instabilities.

The final steps of the arc length control routine are represented by blocks 254 and 255 where the error E which had been used on the present pass is stored now in register E1 and the previous error quantity which had been in register E1 is stored now in register E2. Thus, the present error will be retained for use in the next two passes of this routine.

Following these steps, a return to the idling state is made as denoted by block 208 on FIG. 4 to which the control routine jumps following execution of the last step.

Figure 6:
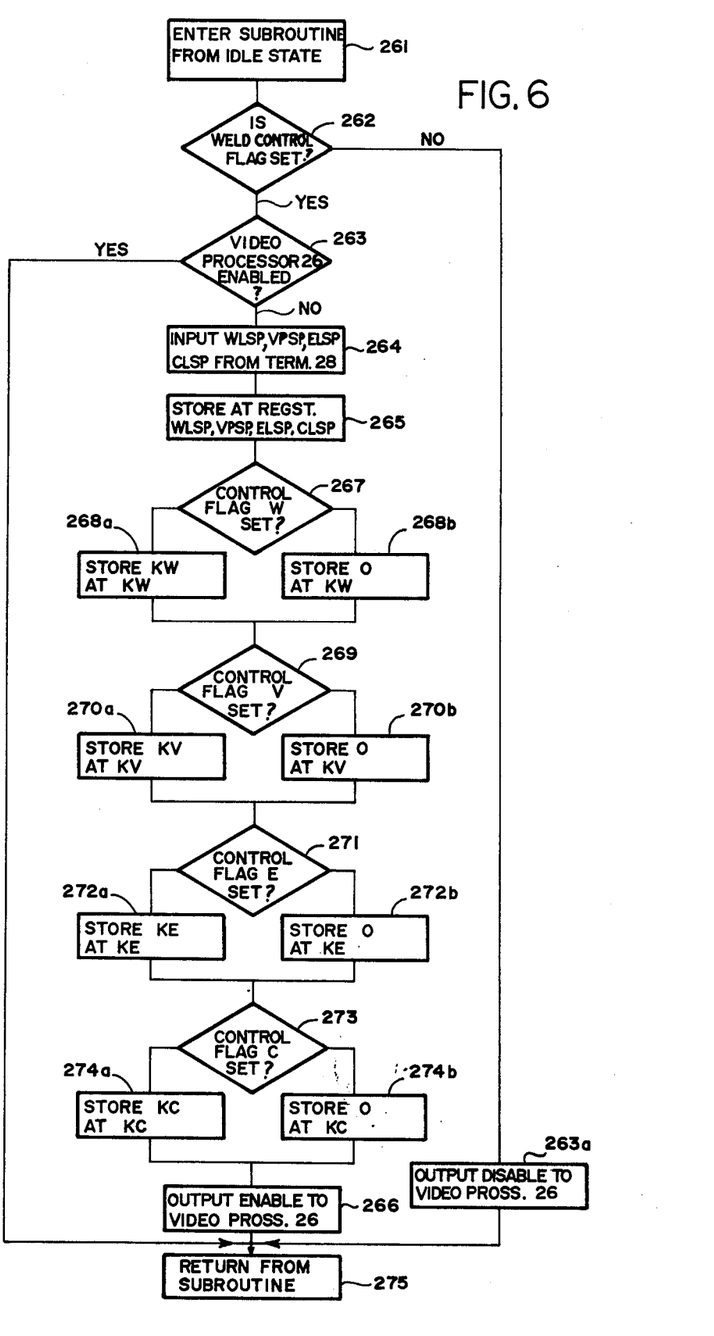
FIG. 6 is a flowchart showing the executive routine.

FIG. 6 represents, in flowchart form, the executive subroutine which is necessary to start the routines previously described and to initialize the set point registers. This subroutine is entered periodically from the idle state as shown in block 261. It immediately checks the weld control flag as shown by block 262. The weld control flag is set whenever a welding arc is established. When the flag becomes set, the program follows the affirmative branch and the set point data WLSP, VPSP, ELSP and CLSP are input from terminal 28 where they have been entered by the operator. These quantities are stored at corresponding registers WLSP, VPSP, ELSP and CLSP.

The next portion of the subroutine is a series of control flag checks in which flags W, V, E and C are set or reset as desired by the operator from terminal 28. Where a flag is set, the associated change factor is stored in a register for use in set point computations during the arc length control routine. Where the flag is reset, 0 is stored at the corresponding register thereby preventing the error function, DELTA, from causing any change to the associated control set point.

At block 267 control flag W is checked. If the flag is set, the affirmative branch is followed to block 268a wherein a constant stored in one of the registers is stored at the register which holds the quantity KW which is subsequently used in the computation of updated weld level set point WLSP as shown in FIGS. 5A–C. On the other hand, if the flag is not set, the number 0 is stored at register KW as shown in block 268b. Similarly, blocks 269 and 270a–b represent the storage of either a quantity KV or 0 at register KV depending on the status of control flag V. Blocks 271 and 272a–b similarly represent storage of either quantity KE or 0 at register KE depending on status of control flag E. Similarly, blocks 273 and 274a–b represent storage of either quantity KC or 0 at register KC depending on status of control flag C.

The control flags may be set in any combination, provided that at least one is set, and arc length will be controlled by the devices corresponding to the set flags. In this manner, at least one of control devices 20–22 and 27 is responsive to a deviation command or parameter to control arc length.

An enabling signal is output to video processor 26 as shown by block 266 following which a return from the subroutine is made to the idling state.

Once video processor 26 is enabled, it will interrupt the idle state 60 times a second as described previously and will cause execution of the arc length control routine ten times a second. In order that the set point registers be initialized just once and then be updated by the computed DELTA function, block 264 is entered by way of the negative branch of block 263 when video processor 26 is disabled. Once the video processor is enabled, blocks 264, 265 and 266 bypassed.

If the flag is reset as would be the case when the arc is terminated, the negative branch from block 262 is followed to block 263a which represents outputting of a disable signal to video processor 26 following which an immediate return to the subroutine at block 275 is made.

TABLE OF COMPONENTS

In system 10, the following components have been used for the operation and function herein described.

| REFERENCE CHARACTER | COMPONENT | MODEL NO. | MANUFACTURER |
| --- | --- | --- | --- |
| 15 | Digital computer | PDP11 | Digital Equipment Corp. |
| 15a | Interface-opto-isolators | MCT-6 | Monsanto |
| 18a-c | Digital to analog converter | DAC 80-CB1-V | Burr Brown |
| 20 | Vertical torch height -DC stepper motor (200 PPR) | 20-2235D 200-F3.7 | Sigma Instrument, Inc. |
| 22 | Electrode wire feeder- DC motor-tachometer | EH-10 | Linde |
| 24 | Video camera | RG 50 | Dage |
| 27 | Auxilliary wire feeder -DC motor-tachometer | EH-10 | Linde |
| 28 | Input/Output Terminal | CONSUL 580 | Applied Digital Data Systems |
| 31 | Monostable multivibrator | 74121 | Texas Instrument |
| 42, 44, 56, 58, 60, 62, 64, 66, 68 | Monostable multivibrator | 74123 | Texas Instrument |
| 32, 86 | Latch | 74116 | Texas Instrument |
| 33, 34, 80 | Flip-flop | 7402 | Texas Instrument |
| 36, 40 | Comparator | NE521 | Signetics |
| 37, 82 | Counter | 2X 74293 | Texas Instrument |
| 21 | Welding Power Supply | U.S. Pat. No. 3,912,980 | |

It will be understood that a known microprocessor may be used instead of computer 15.

What is claimed is:

1. An optical system for controlling the length of a welding arc between a pair of electrodes comprising
   optical means for optically sensing said arc and producing arc signals related to said arc,
   reference setting means for producing a reference signal corresponding to a desired arc length,
   difference means coupled to said optical means and said reference setting means and responsive to said arc signals for measuring the arc length and producing a difference signal related to the difference between said measured arc length and said desired arc length,
   a plurality of control devices each operable for changing the length of said arc in accordance with a respective set point signal, and
   controlling means including incrementing means responsive to said difference signal for producing a set point signal for each control device by an updating function of a prior respective set point signal.

2. The optical system of claim 1 in which said incrementing means includes means for updating each said prior set point signal of a control device by adding a respective weighted difference signal and command means for applying each updated set point signal to a respective control device thereby to control the length of said arc to said desired length.

3. The optical system of claim 1 in which said incrementing means includes means for setting a plurality of change scalar factors each related to a desired change in arc length by a corresponding change in value of set point signal of a respective control device, means for producing for each control device an updated set point signal equal to a prior respective set point signal plus the difference signal weighted by a corresponding change scalar factor and command means for applying each updated set point signal to a respective control device thereby to control the length of said arc to said desired length.

4. The optical system of claim 3 in which said optical means comprises a video camera and in which said difference means includes a video processor circuit having a register for producing data pulses related to the measurement of the length of said arc.

5. The optical system of claim 4 in which said video camera includes a field of view onto which the bright image of said welding arc is focused for producing said arc signals.

6. The optical system of claim 5 in which said video processor circuit includes means for counting the number of horizontal scans which intersect the bright image of said arc in the field of view of said video camera for producing said data pulses.

7. The optical system of claim 6 in which a first of said control devices is a welding power supply electrically connected to said pair of electrodes for controlling the electrical power applied to said arc in accordance with a respective set point signal.

8. The optical system of claim 7 in which a second of said control devices is an electrode wire feed device for feeding electrode wire forming one of said electrodes in accordance with a respective set point signal.

9. The optical system of claim 8 in which a third of said control devices is a vertical torch height drive for varying the height between said pair of electrodes in accordance with a respective set point signal.

10. The optical system of claim 9 in which a fourth of said control devices is an auxiliary wire feed for feeding auxiliary wire into said arc in accordance with a respective set point signal.

11. The optical system of claim 3 in which said command means includes means for multiplying each set point signal by a respective scaling factor to produce appropriate digital command data suitable for the particular control device.

12. The optical system of claim 3 in which said setting means includes means for setting one or more of said change scalar factors to zero whereby said command means is effective to apply a disabling set point signal to a control device having a zero change scalar factor.

13. The optical system of claim 12 in which there is provided means for setting a plurality of additional scalar factors each related to a predetermined increment of arc length produced by a predetermined increment in value of set point signal of a respective control device, and said updated set point producing means for each control device being further weighted by a respective additional scalar factor.

14. The optical system of claim 13 in which said difference means includes means for correcting the difference signal in accordance with at least the prior difference signal, a predetermined derivative time constant and a predetermined integral time constant.

* * * * *

UNITED STATES PATENT OFFICE
CERTIFICATE OF CORRECTION

Patent No. 4,093,844            Dated June 6, 1978

Inventor(s) James Erwin Fellure and Endre Leslie Toth

It is certified that error appears in the above-identified patent and that said Letters Patent are hereby corrected as shown below:

Column 7, line 35, "devides" should read -- divides --.

Column 7, line 66, "VLSP1" should read -- WLSP1 --.

Column 7, line 68, "WLSP1" should read -- VLSP1 --.

Column 8, line 38, "proprirate" should read -- propriate --.

Column 9, line 30-31 "((E2-E1)-(E1 E))" should read

-- [(E2-E1)-(E1 E)] --.

Column 9, line 51 "inpedendent" should read -- independent --.

Signed and Sealed this

Twelfth Day of December 1978

[SEAL]

*Attest:*

RUTH C. MASON
*Attesting Officer*

DONALD W. BANNER
*Commissioner of Patents and Trademarks*